US006256700B1

(12) United States Patent
Sauber

(10) Patent No.: US 6,256,700 B1
(45) Date of Patent: Jul. 3, 2001

(54) BUS/PORT SWITCHING SYSTEM AND METHOD FOR A COMPUTER

(75) Inventor: Bill Sauber, Georgetown, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/281,700

(22) Filed: Mar. 30, 1999

(51) Int. Cl.$^7$ .............................. G06F 13/00; G06F 13/40
(52) U.S. Cl. ........................ 710/129; 710/38; 710/103; 710/129; 710/131
(58) Field of Search .................................. 710/126–132, 710/36, 38, 2, 101–103

(56) References Cited

U.S. PATENT DOCUMENTS

| | | | |
|---|---|---|---|
| 4,751,634 | * 6/1988 | Burrus, Jr. et al. | 710/63 |
| 4,933,845 | * 6/1990 | Hayes | 710/104 |
| 5,099,516 | 3/1992 | Durkin et al. | 380/4 |
| 5,386,517 | * 1/1995 | Sheth et al. | 710/60 |
| 5,416,776 | * 5/1995 | Panzarella et al. | 370/463 |
| 5,467,453 | 11/1995 | Kocis | 710/101 |
| 5,511,227 | 4/1996 | Jones | 710/9 |
| 5,600,801 | 2/1997 | Parks et al. | 710/102 |
| 5,608,884 | 3/1997 | Potter | 710/124 |
| 5,742,794 | 4/1998 | Potter | 395/500 |
| 5,809,262 | 9/1998 | Potter | 710/129 |
| 5,935,232 | * 8/1999 | Lambrecht et al. | 710/128 |

\* cited by examiner

Primary Examiner—Sumati Lefkowitz
(74) Attorney, Agent, or Firm—Haynes and Boone, L.L.P.

(57) ABSTRACT

A system and method for dynamically switching buses and ports inside a computer. The system configures the connection of first and second buses/ports for buses as USBs or 1394 buses, to another bus such as a PCI bus. The system includes first and second interfaces for connecting the PCI bus to the first and second buses. A switching system selectively connects the first and second buses to a plurality of ports. The switching system is responsive to bus requirements of any devices connected to the ports so that the total requirements for all the devices is balanced between the first and second interfaces.

35 Claims, 4 Drawing Sheets

BUS/PORT SWITCHING SYSTEM AND METHOD FOR A COMPUTER

TECHNICAL FIELD

One embodiment relates generally to computer bus architecture and, more particularly, to a technique for manipulating connections on one or more buses and ports of a computer.

BACKGROUND

Most computers have a layered bus architecture for supporting the various components that comprise or interface with the computer. For example, a personal computer typically includes a local bus for connecting high speed devices, such as a microprocessor and cache memory. Connected to the local bus through a bus interface is often one or more peripheral buses, for connecting disk drives and the like. In many instances, both internal and external peripheral buses, such as a small computer systems interface or a universal serial bus, exist in a variety of configurations.

One purpose of the peripheral buses is to provide ports for peripheral devices such as storage devices, modems, joysticks, keyboards, and pointer devices. A port represents a physical or electrical bus interface, such as a slot or a connector, but in a broad sense, can be considered part of the bus that it is interfacing. Therefore, the terms "bus" and "port" are, in many instances, interchangeable. Since the peripheral devices are selectively connected to ports (either directly or through another bus), the devices are often attached by users or computer assemblers with little or no knowledge as to the optimal placement of each device. As a result, problems sometime result from a less-than-optimum bus/port arrangement.

One problem stems from the rate at which data must be supplied to or from a device. For example, a floppy disk drive is a device that is used only sparingly and has a relatively low data rate, or bandwidth. A modem is a device that is used often and has a relatively moderate bandwidth. A digital camera is a device that is used sparingly and requires a relatively high bandwidth. Therefore, it is important to properly place each peripheral device on a peripheral bus to maximize the use and bandwidth requirements for each device.

The above-described problem is exacerbated by the increasing popularity of external peripheral buses such as a universal serial bus ("USB") or an IEEE 1394 serial bus ("1394 bus"). The USB is a two-wire serial personal computer bus, designed by a consortium of computer makers and suppliers, which can support many peripheral devices either in parallel or in a daisy chain configuration. The USB has a relatively high total bandwidth and uses inexpensive cable, which can be up to 5 meters long. The 1394 bus is a four-wire serial personal computer bus, very similar to the USB except with a higher bandwidth and can be up to 4.5 meters long. Specifications for the 1394 bus are available from the Institute of Electrical and Electronics Engineers, Inc. ("IEEE"), 345 East 47th Street, New York, N.Y. 10017-2394. For both the USB and the 1394 bus, when a device is connected to the bus, it provides information that identifies its type and in some cases, bandwidth requirements.

These external buses present a greater problem because of their universal use. Typically, these external buses are serial (instead of parallel), have ports on the outside of the computer, and can support very many devices. Furthermore, with the increasing popularity of plug and play devices, the arrangement of devices to a particular port of an external bus can change frequently.

For example, a computer may include four USB ports, the first two connected to a primary bus such as a peripheral component interconnect ("PCI") bus inside the computer through a first interface controller and the second two USB ports connected to the PCI bus through a second interface controller. A user of the system may connect a joystick to the first USB port, a digital camera to the third USB port, and a modem to the fourth USB port. In the present example, the joystick requires a relatively low asynchronous bandwidth to the PCI bus, the modem requires a relatively low-to-medium asynchronous bandwidth but frequent use, and the digital camera requires a relatively high isochronous (allocated) bandwidth. The first interface controller that supports the first USB can readily support the low bandwidth requirements of the joystick. However, the second interface controller struggles to support the high isochronous bandwidth requirements of the digital camera and the medium bandwidth requirement of the modem. Therefore, the second interface controller becomes a bottleneck for the digital camera and the modem.

The problem described above would not have occurred if the user had placed the two higher bandwidth devices (the digital camera and the modem) on USB ports connected to separate interface controllers. However, it is undesirable to require such sophisticated user interaction. Furthermore, since these are plug-and-play devices, constant changes to the arrangement of devices on the USB ports and varying use of application programs on the computer make it almost impossible for any sophisticated user to continually implement the optimum bus arrangement.

Therefore, what is needed is a system and method for automatically arranging the devices of one or more buses to balance the efficiency of each interface device supporting the buses. The efficiency should consider bus requirements for each device, such as bandwidth, frequency of use, isochronous vs. asynchronous, and so forth.

SUMMARY

In response to the aforementioned problems, a technical advance is achieved by a system and method for dynamically switching ports on buses inside a computer. In one embodiment, the system configures the connection of first and second port connections (device connection interfaces) of two buses, such as USB or 1394, to first and second ports of the bus controllers. A switching system selectively connects the first and second interfaces to the first and second bus ports responsive to bus requirements of any devices connected to the ports. As a result, the bus requirements such as bandwidth, frequency of use, isochronous vs. asynchronous, and so forth, for all the devices is relatively balanced between the two interfaces.

In some embodiments, the first and second buses support a continually changing arrangement of devices and the switching system is responsive to the changing arrangement. Using the USB example, the first and second buses may support plug-and-play devices and allow continual changes in device types and locations.

The switching system may include a switch matrix having, for example, a plurality of field effect transistors to perform the switching functions. In some embodiments, the switching system also includes four physical interface layers, two associated with the first and second interfaces and two associated with the first and second ports. The four physical interface layers and switching matrix may be co-located, such as on a single integrated circuit, to facilitate tight timing constraints of the first and second buses.

In some embodiments, the switching system is responsive to control signals that change as the arrangement of devices change. The control signals may be driven by various sources. For example, a processor connected to the primary bus may drive the control signals under the control of an operating system or a basic input/output system. The processor may change ports based on active applications running on the processor or other system requirements. Also, one of the interfaces may drive the control signals in response to the types and requirements of the devices connected to the ports.

Furthermore, some embodiments of the system may also configure additional buses and ports.

A technical advantage is achieved because the computer can automatically provide an optimum arrangement of devices on multiple buses. Also, the computer can dynamically change this arrangement, which is especially beneficial with plug-and-play devices.

DESCRIPTION OF A PREFERRED EMBODIMENT

Figure 1:
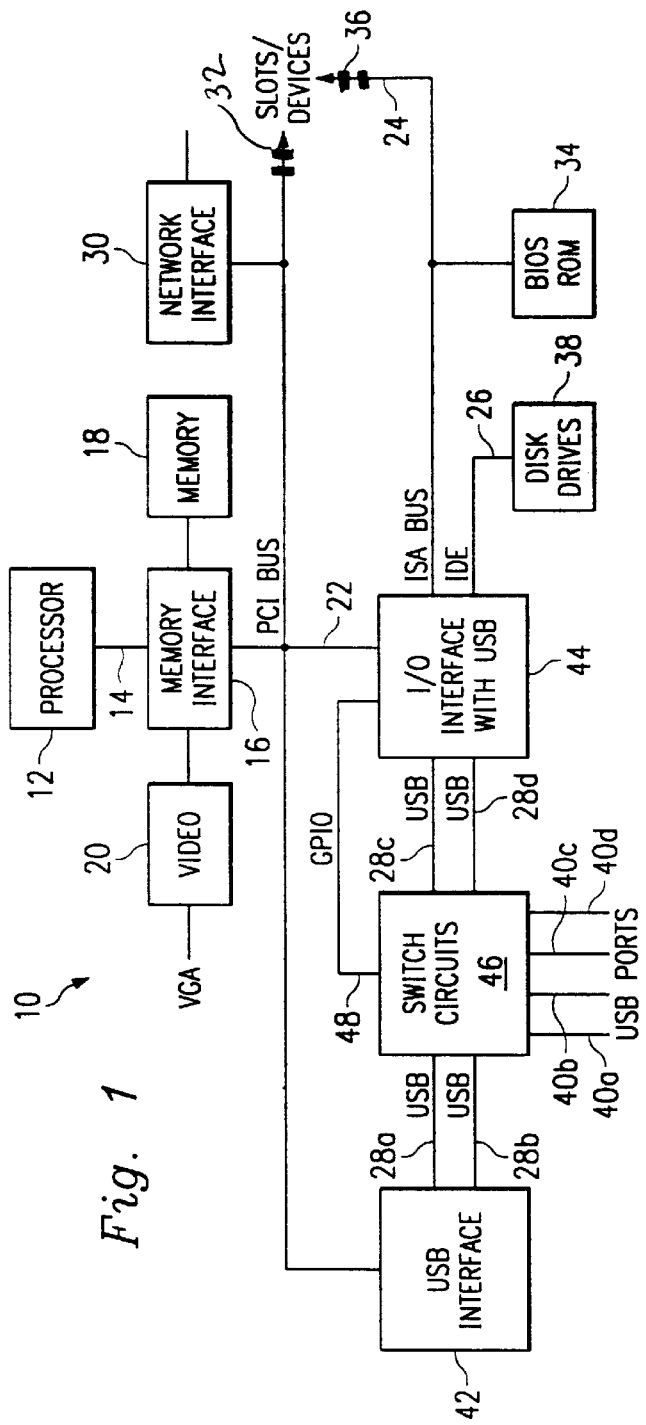
FIG. 1 provides a block diagram of one embodiment of a computer including several different buses and bus interfaces.

Referring to FIG. 1, the reference numeral 10 designates, in general, a computer for implementing several different embodiments. The computer 10 is illustrated with many different components, it being understood that most of the components may be used by some embodiments and not by other embodiments. Actual component types are also discussed for the sake of example, it being further understood that a wide variety of substitution is expected for different embodiments.

The computer 10 includes a processor 12, which may for example be one capable of supporting an operating system such as Windows 98 from Microsoft Corporation of Redmond, Wash. The processor 12 connects to a local bus 14 for accessing one or more components, including a memory interface 16 for accessing a main memory 18 and a video card 20 for driving a video device (not shown). The memory interface 16 interconnects the local bus 14 with one or more peripheral buses, such as a PCI bus 22, an industry standard architecture ("ISA") bus 24, an integrated drive electronics ("IDE") bus 26, and USB ports 28a, 28b, 28c, 28d, as described below.

The PCI bus 22 connects to one or more peripheral devices, such as a network interface card 30, and may connect to even more devices through one or more PCI ports 32. Similarly, the ISA bus 24 connects to one or more peripheral devices, such as a storage of basic input/output system ("BIOS") code 34 and may connect to even more devices through one or more ISA ports 36. The IDE bus 26 also connects to one or more peripheral devices, such as a hard disk drive 38. The USB ports 28a, 28b, 28c, 28d may connect to any number of components (not shown) through one or more of the ports 40a, 40b, 40c, 40d. The ports 40a–d do not necessarily correspond to the USB ports 28a–d, as discussed in greater detail, below.

The USB ports 28a, 28b connect with the PCI bus 22 through an interface 42. In the present example, the interface 42 is a serial bus peripheral controller. Likewise, the USB ports 28c, 28d connect with the PCI bus 22 through an input/output ("I/O") interface 44. In the present example, the interface 44 is an I/O Peripheral Controller from Intel, Corp. of Santa Clara, Calif. The interface 44 performs the same USB controller functions as the interface 42, but also performs many other I/O functions such as interfacing the PCI bus 22 to the IDE bus 26 and ISA bus 24. The USB ports 28a, 28b, 28c, 28d described herein may alternatively be described as intermediate ports. This is because the USB ports 28a, 28b, 28c, 28d do not necessarily connect to any devices, but instead are used to connect the controllers 42, 44 to the ports 40a–40 d. In many embodiments, more USBs are connected to the ports 40a–40d and to other devices, such as those illustrated in FIGS. 6a–6b.

The computer 10 also includes a switch system 46 that receives the four USB ports 28a–28d from the controllers 42, 44, and receives a general purpose I/O register ("GPIO") 48 from the I/O interface 44. The switching system 46 selectively routes signals from the USB ports 28a–28d to the USB ports 40a–40d as described in greater detail, below.

Figure 2:
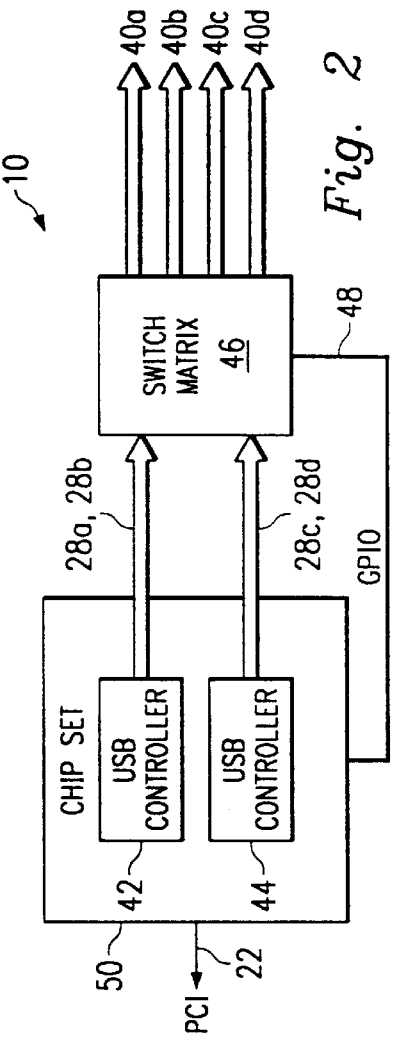
FIG. 2 provides a block diagram of one embodiment of two bus interfaces and a switch system for the computer of FIG. 1

Referring to FIG. 2, in some embodiments, the USB controllers 42, 44 are grouped as a single circuit 50 for providing an interface between the PCI bus 22 and the USB ports 28a–28d. The switch system 46 may also be included in the circuit 50. It is understood that the number, type, and arrangement of the controllers 42, 44 is inconsequential for implementing the present embodiments and is provided merely for example.

Figure 3:
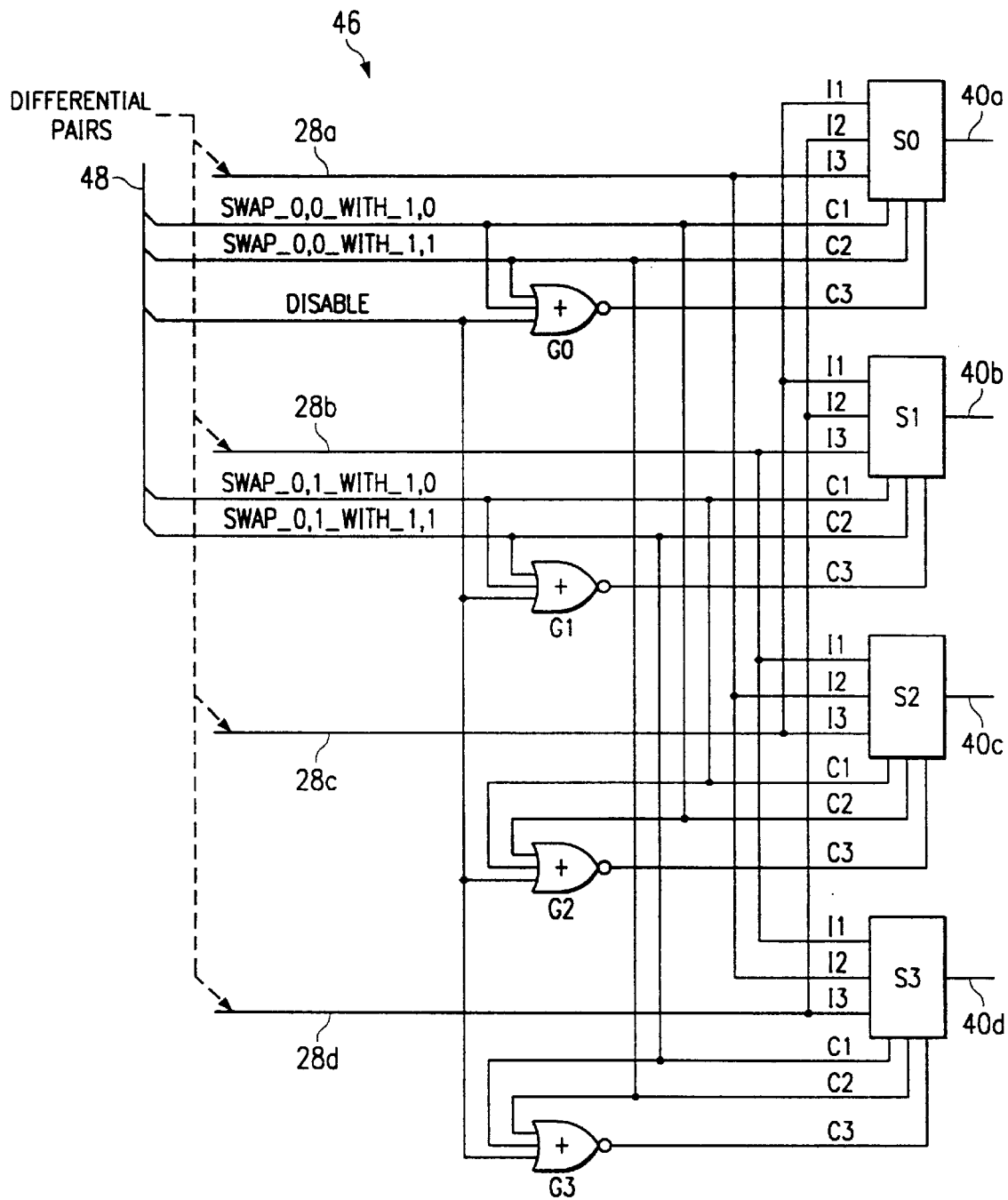
FIG. 3 provides a logical block diagram of one embodiment of the switch system described FIG. 2.

Referring to FIG. 3, the switch system 46 is illustrated with a plurality of NOR gates G0, G1, G2, G3 and a plurality of switches S0, S1, S2, S3. It is understood, however, that this is merely a logical block diagram and that there are many different ways to implement the switch system 46 as a switch matrix.

The switch system 46 receives a plurality of signals from the GPIO 48. Several of the signals use reference numbers to identify a certain USB controller or USB. For the sake of reference, USB controller 42 is reference number "0," USB controller 44 is reference number "1," and USB ports 28a–28d are defined with the reference numbers in Table 1, below:

TABLE 1

| USB port | USB controller 42 | USB controller 44 | Reference No. |
| --- | --- | --- | --- |
| 28a | controller port 0 |  | (0,0) |
| 28b |  | controller port 1 | (0,1) |
| 28c | controller port 0 |  | (1,0) |
| 28d |  | controller port 1 | (1,1) |

Since in the present example there are two USB controllers 42 and 44, each with two controller ports connected to USB ports 28a, 28b and 28c, 28d, respectively, multiple control signals can be used. Each of the USB ports 28a–28d route to ports 40a–40d, respectively, unless modified by the control signals described below in Table 2:

TABLE 2

| Control Signal | Function |
| --- | --- |
| swap_0,0_with_1,0 | route USB port 28a to port 40c, and route USB port 28c to port 40a |
| swap_0,0_with_1,1 | route USB port 28a to port 40d, and route USB port 28d to port 40a |
| swap_0,1_with_1,0 | route USB port 28b to port 40c, and route USB port 28c to port 40b |
| swap_0,1_with_1,1 | route USB port 28b to port 40d, and route USB port 28d to port 40b |
| disable | disable (discussed in greater detail below). |

The disable control signal, combine with no other swap signals, prevents transient device detection during reconfiguration. This serves several purposes, such as to allow current, standard software mechanisms to detect hot-plug events, if desired.

Figure 4:
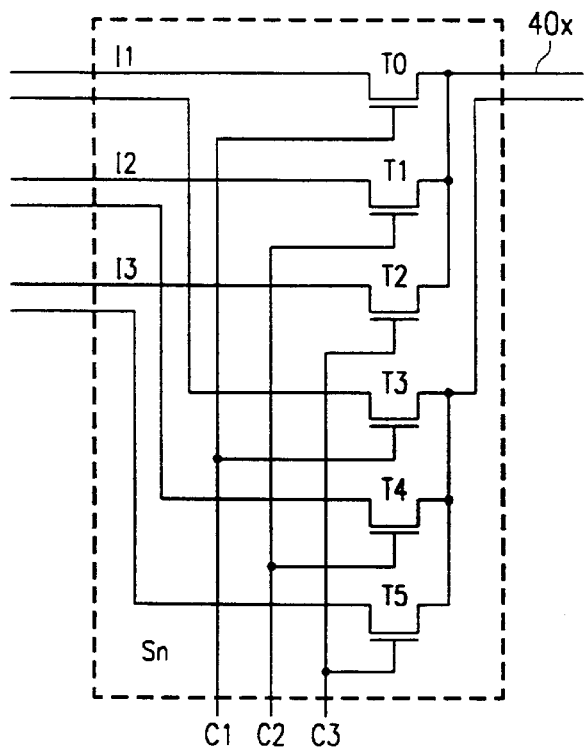
FIG. 4 provides a schematic of a switch used by the switch system of FIG. 3.

Referring also to FIG. 4, each switch S0, S1, S2, S3 (generically referenced as "Sn") includes three input pairs I1, I2, I3, three control inputs C1, C2, C3, and one output pair 40x (output pair 40x represents ports 40a–40d for switches S0–S3, respectively). The inputs I1–I3 and output 40x are grouped as pairs because each USB port 28a–28d includes two-wires. It is understood, however, that if the bus had a different number of wires, the inputs I1–I3 and outputs 40a–40d would be configured accordingly.

For the sake of reference, each switch S0–S3 generally corresponds to USB port 28a–28d, respectively. Each USB port is supplied to the I3 input of its corresponding switch. This represents a default position for that switch. The inputs I1 and I2 of each switch are connected to the two USB ports that are connected to the opposite controller than that connected to the USB port at input I3. For example, switch S0 receives USB port 28a (connected to USB controller 42) into the input I3 and receives USB ports 28c, 28d (both connected to USB controller 44) into the inputs I1, I2, respectively.

Each switch Sn includes six field effect transistors ("FETs") T1, T2, T3, T4, T5, T6. The control signals C1–C2 control the transistors T1–T6 for each switch S0–S3. Considering switch S0 for example, if both control signals swap_0,0_with_1,0 (control signal C1) and swap_0,0_with_1,1 (control signal C2) are disabled, then NOR gate G0 will enable control signal C3. As a result, FETs T2 and T5 will be active (conducting) and FETs T1, T3, T4, and T6 will be inactive (open), thereby connecting I3 (USB port 28a) to port 40a. If, however, swap_0,0_with_1,0 (control signal C1) is enabled and swap_0,0_with_1,1 (control signal C2) is disabled, then NOR gate G0 will disable control signal C3. As a result, FETs T1 and T4 will be active and FETS T2, T3, T5, and T6 will be inactive, thereby connecting I1 (USB port 28c) to port 40a.

Figure 5:
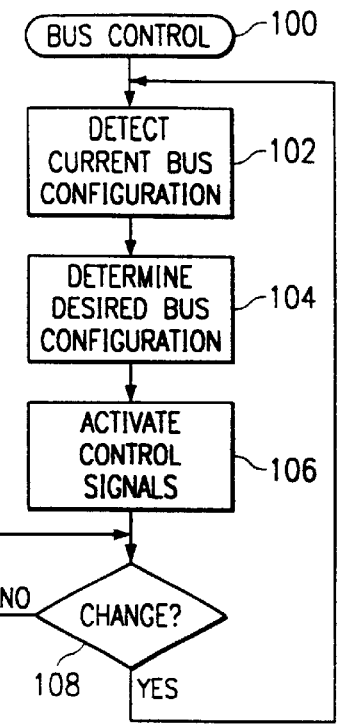
FIG. 5 provides a flow chart of a routine performed by the computer of FIG. 1 for activating a desired bus/port configuration.

Referring to FIG. 5, the computer 10 performs a bus control method 100 to update the switch matrix 46. At step 102, the computer 10 detects a current configuration of the USB ports 28a–28d. This detection can consider several different factors, such as the ones listed below:
Is each bus/port operable?
What devices are connected to each bus/port?
What is the data bandwidth requirement for each device?
How often is this device typically used?
What type of communication (e.g., isochronous) does each device use?
What is the data bandwidth requirement for each device with respect to applications currently being executed by the processor 12?

At step 104, the computer 10 determines a desired bus/port configuration with respect to the devices attached thereto. For the computer 10, a desired bus/port configuration would balance the devices so that the requirements of each USB controller 42, 44 is about the same.

At step 106, the computer 10 activates the control signals of the GPIO 48 to achieve the desired configuration. At step 108, the computer 10 detects any change in the devices or any changes in the use of the devices by the computer. If a change occurs, execution returns to step 102 and the bus control method 100 repeats.

Figure 6A:
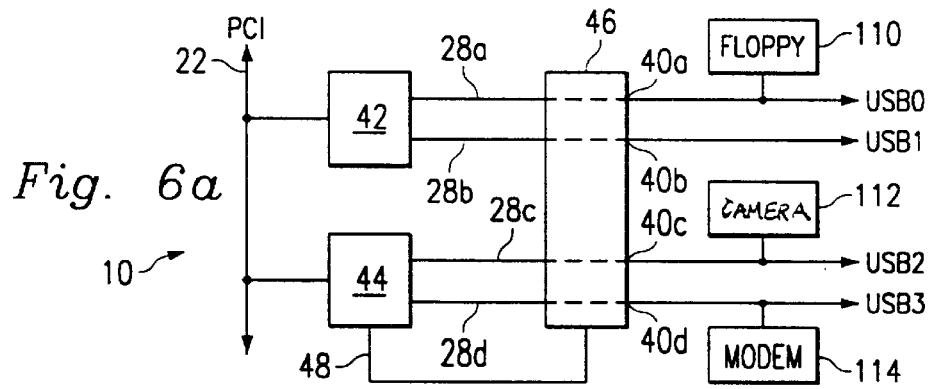
FIGS. 6a–6b provide exemplary bus and device configurations for implementing the routine of FIG. 5.

Referring also to FIG. 6a, the bus control method 100 can be illustrated with an exemplary configuration of the computer 10. In the present example, the computer 10 includes 4 external USB ports USB0, USB1, USB2, USB3 connected to the ports 40a, 40b, 40c, 40d, respectively. A floppy disk drive 110 is connected to USB0; a digital camera 112 is connected to USB2; and a modem 114 is connected to USB3. In furtherance of the present example, the floppy disk drive 110 has a relatively low bandwidth requirement and is used only sparingly, the digital camera 112 has a relatively medium bandwidth requirement and is used only sparingly, and the modem 114 has a relatively high bandwidth requirement and is used frequently. At this stage of the bus control method 100, the devices 110–114 have been arbitrarily connected to the external USBs and the switch matrix provides direct connection between intermediate or internal USB ports 28a, 28b, 28c, 28d and ports 40a, 40b, 40c, 40d, respectively (illustrated with dashed lines in the switch matrix 46).

At step 102 of the bus control method, the configuration of the devices 110–114 is detected. This detection may be performed by one or more different components of the computer 10. For example, one or both of the two bus controllers 42, 44 may detect the different devices 110–114. The controller may then report the configuration to another component, such as the processor 12. At step 104, a desired bus configuration is determined. This also may be done by one or more different components of the computer 10. For example, an operating system running in the processor 12 may receive the bus/port configuration from the controllers 42, 44 and then determine a desired bus/port configuration based on the present configuration and requirements of the computer 10 or applications running on the computer. Alternatively, the BIOS 34 may receive the bus/port configuration from the controllers 42, 44 and then determine a desired bus/port configuration based on the present configuration and requirements of the computer 10. In the present example, the modem 114, being the device with the most frequent use, and the digital camera 112, being the device with the highest bandwidth, should be connected to different USB controllers.

Figure 6B:
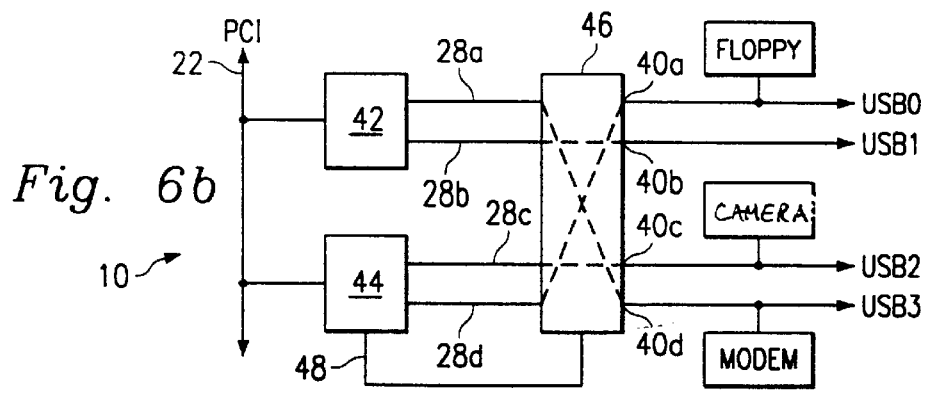

Referring to FIG. 6b, at step 106, the USB controller 44 enables the control signal swap_0,0_with_1,1 (control signal C2). In response, the switch matrix provides direct connection between internal USB ports 28a, 28b, 28c, 28d and ports 40d, 40b, 40c, 40a, respectively (illustrated with dashed lines in the switch matrix 46). As a result, the devices 110–114 are connected to the interfaces 42, 44 in a balanced (to an acceptable degree) arrangement.

Different occurrences may require a change to the configuration described above. Since USB0–USB3 are plug-and-play compatible, a user may add, remove, or move devices on the different ports. Also, different programs running on the computer 10 may utilize different devices differently, thereby altering the usage requirements of each device. For example, a user may add a pointer device to USB0 and the computer may no longer require the use of the modem 114. As a result, a different optimum bus/port configuration would exist. Therefore, the bus control method 100 can repeat many different times.

Figure 7:
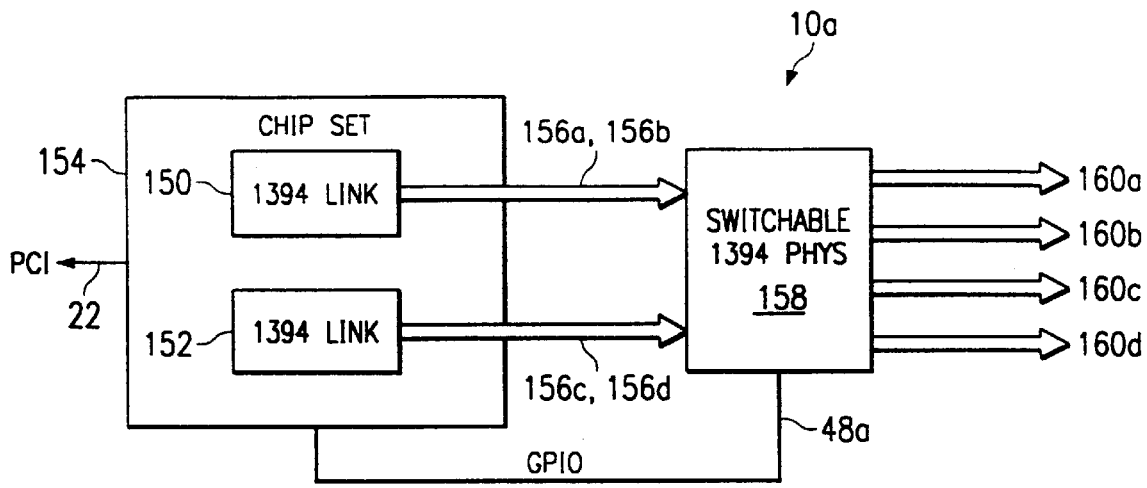
FIG. 7 provides a block diagram of another embodiment of two bus interfaces and a switch system for the computer of FIG. 1

Referring to FIG. 7, a computer 10*a* represents another embodiment of the computer 10 of FIG. 1. The computer 10*a* utilizes 1394 buses instead of, or in addition to, the USBs of FIG. 1. In many aspects, 1394 buses are similar to USBs, except that they are 4-wire instead of 2-wire buses. In the present example, two 1394 link controllers 150, 152 are grouped in a single device 154 for providing an interface between the PCI bus 22 and two 1394 interfaces 156*a*, 156*b*. A 1394 "interface" is similar to a 1394 "port," but is distinguished herein for the sake of clarity.

The 1394 interfaces 156*a*, 156*b* and the GPIO 48*a* are routed to a switch system 158. The switch system 158 selectively routes signals from the 1394 interfaces 156*a*, 156*b* to 1394 ports 160*a*–160*d*. The switch system 158 provides the same function as the switch system 46 (FIG. 2), but operates differently due to different requirements of the 1394 bus.

The 1394 bus has tight timing constraints that basically require direct physical interface layer ("PHY") to PHY connections for high speed data transfers. The 1394 bus will not, in theory, support an intermediate switching matrix, such as described in FIG. 2.

Figure 8:
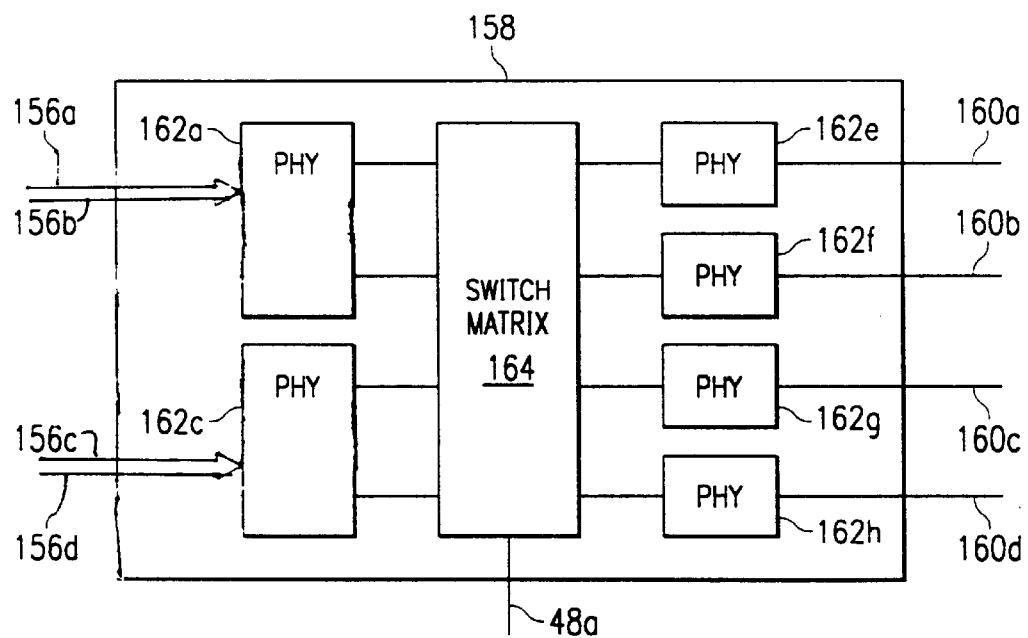
FIG. 8 provides a logical block diagram of one embodiment of the switch system described FIG. 7.

Referring to FIG. 8, the switch system 158 includes a plurality of PHYs, including PHYs 162*a*, 162*c*, 162*e*, 162*f*, 162*g*, 162*h*, for 1394 interfaces 156*a*, 156*b* and 1394 ports 160*a*, 160*b*, 160*c*, 160*d*, respectively. It is understood, however, that different PHY arrangements can also be provide. Located between the two PHYs 162*a* and 162*c* and the other four PHYs 162*e*–162*h* is a switch matrix 164 under control of signals from the GPIO 48*a*. The switch matrix 164 may behave similarly to the switch matrix 46 of FIG. 2, or other switching circuits may be employed.

The PHYs 162*a*–162*h* are located very close together and to the switch matrix 164. In some embodiments, they may all be co-located on a single integrated circuit. Although the switch matrix 164 adds a propagation delay that is otherwise unacceptable, the close proximity of the PHYs 162*a*–*h* to one another and to the switch matrix 164 provides a significant speed increase. Because the speed increase offsets the propagation delay of the switch matrix 164, the timing constraints of the 1394 bus are met by the switch system 158.

Although illustrative embodiments have been shown and described, other modifications, changes, and substitutions are intended in the foregoing disclosure. For one, both internal and external buses can benefit from the present disclosure. For example, the slots 32, 36 can be enhanced with one or more switching systems to balance the requirements of internal devices. Further still, the primary bus does not have to be the PCI bus 22 but may alternatively be the ISA bus 24, the IDE bus 26, another USB or 1394 bus, or the local bus 14. Accordingly, it is appropriate that the appended claims be construed broadly and in a manner consistent with the scope of the disclosure.

What is claimed is:

1. A computer system comprising:

first, second, and third buses;

first, second, and third ports;

first and second interfaces for connecting the first and second buses to the third bus, respectively; and means for selectively connecting each of the first, second, and third ports to one of either the first or second buses, wherein the means for selectively connecting is responsive to bus requirements of any devices connected to the ports so that the total bus requirements for all the devices is relatively balanced between the first and second interfaces.

2. The computer system of claim 1 wherein the connecting means is responsive to changes at one or more of the first, second, and third ports.

3. The computer system of claim 1 further comprising:

a control bus connected to the connecting means;

wherein the connecting means is responsive to signals from the control bus.

4. The computer system of claim 3 wherein the first interface determines the signals on the control bus.

5. The computer system of claim 3 wherein the first interface determines the signals on the control bus responsive to a bandwidth of a device connected to the first port.

6. The computer system of claim 3 further comprising:

a processor connected to the third bus;

wherein the processor determines the signals on the control bus.

7. The computer system of claim 6 wherein the processor is running an operating system and the processor drives the signals responsive to the operating system.

8. The computer system of claim 6 wherein the processor is running a BIOS and the processor drives the signals responsive to the BIOS.

9. A system for configuring a connection between a plurality of ports and a main peripheral bus, the system comprising:

first and second interfaces connected to the main peripheral bus;

first and second buses connected to the first and second interfaces, respectively; and a switching system for selectively connecting the plurality of ports to the first and second buses;

wherein the switching system is responsive to bus requirements of any devices connected to the ports so that the total bus requirements for all the devices is relatively balanced between the first and second interfaces.

10. The system of claim 9 wherein the first and second buses support a continually changing arrangement of devices and the switching system is responsive to the changing arrangement.

11. The system of claim 9 wherein the first and second buses support a continually changing arrangement of active applications of the devices and the switching system is responsive to the changing arrangement.

12. The system of claim 10 wherein the first and second buses are plug-and-play buses.

13. The system of claim 12 wherein the switching system is responsive to control signals from the first interface device.

14. The system of claim 12 wherein the switching system is responsive to control signals from a processor.

15. The system of claim 10 wherein the first and second buses are universal serial buses.

16. The system of claim 10 wherein the first and second buses are 1394 buses.

17. The system of claim 16 wherein the switching system includes a plurality of physical interface layers, including first and second physical interface layers connected to the first and second 1394 buses and additional physical interface layers connected to the plurality of ports.

18. The system of claim 17 wherein the switching system further includes a switching matrix connected between the first and second physical interface layers and the other physical interface layers.

19. The system of claim 18 wherein the plurality of physical interface layers and switching matrix are co-located.

20. The system of claim 16 wherein the switching system includes a switch matrix.

21. The system of claim 20 wherein the switching matrix includes a plurality of field effect transistors.

22. The system of claim 9 further comprising:

a third bus connected to the first interface;

wherein the switching system selectively connects the plurality of ports to the first, second, and third buses responsive to bus requirements of any devices connected to the ports, so that the total bus requirements for all the devices is relatively balanced between the first and second interfaces.

23. A method for connecting three ports to a shared bus, the method comprising the steps of:

providing first and second interfaces connected to the shared bus;

providing first and second buses connected to the first and second interfaces, respectively;

selectively connecting the three ports to the first and second buses responsive to bus requirements of any devices connected to the ports so that the total requirements for all the devices is relatively balanced between the first and second interfaces.

24. The method of claim 23 wherein the first and second buses support a continually changing arrangement of devices and the step of selectively connecting is responsive to the changing arrangement.

25. The method of claim 23 wherein the first and second buses support a continually changing arrangement of active applications and the step of selectively connecting is responsive to the changing arrangement.

26. The method of claim 23 wherein the first and second buses are plug-and-play buses.

27. The method of claim 24 wherein the step of selectively connecting is responsive to control signals from the first interface device.

28. The method of claim 24 wherein the step of selectively connecting is responsive to control signals from a processor.

29. The method of claim 26 wherein the step of selectively connecting utilizes at least five physical interface layers, one physical interface layers associated with each of the first and second interfaces and the three ports.

30. The method of claim 29 wherein the step of selectively connecting further utilizes a switching matrix connected between the five physical interface layers.

31. The method of claim 30 wherein the switching matrix and the five physical interface layers are co-located in an integrated circuit.

32. The method of claim 23 wherein the step of selectively connecting utilizes a switch matrix.

33. The method of claim 32 wherein the switch matrix includes a plurality of field effect transistors.

34. A computer comprising:

a) a processor;

b) a peripheral bus connectable to the processor;

c) first, second, third, and fourth secondary buses;

d) first, second, third, and fourth ports;

e) a first bus interface connected between the peripheral bus and the first and second secondary buses;

f) a second bus interface connected between the peripheral bus and the third and fourth secondary buses;

g) a system for selectively connecting the first, second, third, and fourth secondary buses to the first, second, third, and fourth ports;

h) a control bus for controlling the operation of the system; and i) a plurality of programming instructions, including:

1) instructions for detecting a first configuration of devices on the first, second, third, and fourth ports;

2) instructions for determining a desired configuration of the first, second, third, and fourth ports; and 3) instructions for activating control signals on the control bus to selectively connect the first, second, third, and fourth secondary buses to the first, second, third, and fourth ports;

wherein the system for selectively connecting is responsive to bus requirements of any devices connected to the ports so that the total bus requirements for all the devices is relatively balanced between the first and second interfaces.

35. The computer of claim 34 wherein the first, second, third, and fourth secondary buses are all serial buses.

* * * * *